US010805448B2

(12) United States Patent
Wang

(10) Patent No.: US 10,805,448 B2
(45) Date of Patent: Oct. 13, 2020

(54) FM TRANSMITTER FOR CAR

(71) Applicant: Shenzhen Jiemeisi Industrial Co., Ltd., Shenzhen (CN)

(72) Inventor: Liyong Wang, Weifang (CN)

(73) Assignee: SHENZHEN JIEMEISI INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 16/509,520

(22) Filed: Jul. 12, 2019

(65) Prior Publication Data

US 2020/0195768 A1 Jun. 18, 2020

(30) Foreign Application Priority Data

Dec. 12, 2018 (CN) .................... 2018 2 2090240 U

(51) Int. Cl.
*H04M 1/725* (2006.01)
*H04M 1/60* (2006.01)
*H04M 1/04* (2006.01)
*H04B 1/034* (2006.01)

(52) U.S. Cl.
CPC .......... *H04M 1/7253* (2013.01); *H04B 1/034* (2013.01); *H04M 1/04* (2013.01); *H04M 1/6091* (2013.01); *H04M 1/72558* (2013.01); *H04M 2250/02* (2013.01)

(58) Field of Classification Search
CPC ............................ H04M 1/7253; H04B 1/034
See application file for complete search history.

(56) References Cited

U.S. PATENT DOCUMENTS

| | | | |
|---|---|---|---|
| 2007/0015485 A1* | 1/2007 | DeBiasio | H04B 1/082 455/345 |
| 2016/0105904 A1* | 4/2016 | Fischer | H04M 1/04 455/39 |

* cited by examiner

*Primary Examiner* — Tuan H Nguyen

(57) ABSTRACT

A transmitter for a car includes a cable, a housing and a mounting member. The housing includes therein a magnetic member, a circuit board, a Bluetooth module, an FM transmitting module, and a control module that are electrically connected to the circuit board. The cable is electrically connected to the circuit board. The mounting member is rotatable with respect to the housing. After the Bluetooth module is connected to the electronic device, the control module is used to receive an audio file transmitted from the electronic device through the Bluetooth module, and process the audio file into audio signals. The control module is further used to transmit the audio signals to the FM transmitting module, and the FM transmitting module is used to transmit the audio signals to a car radio of the car.

7 Claims, 3 Drawing Sheets

FM TRANSMITTER FOR CAR

CROSS REFERENCE TO RELATED APPLICATIONS

This application claims priority to Chinese Patent Application No. 201822090240.1, filed Dec. 12, 2018, which is hereby incorporated by reference herein as if set forth in its entirety.

BACKGROUND

1. Technical Field

The present disclosure generally relates to FM transmitters, and particularly to an FM transmitter for a car.

2. Description of Related Art

Many people like listening to music when they are driving. Music helps fight the negative effects of environmental noise and helps the driver focus on the task at hand. In recent years, there has been a car transmitter that can play music and be connected to a car stereo to play music on the car stereo. Conventional car transmitters can only control audio, and they need to be connected to an external electronic device via Bluetooth during operation. When the battery of the external electronic device is low, the car transmitters cannot be connected to the external electronic device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
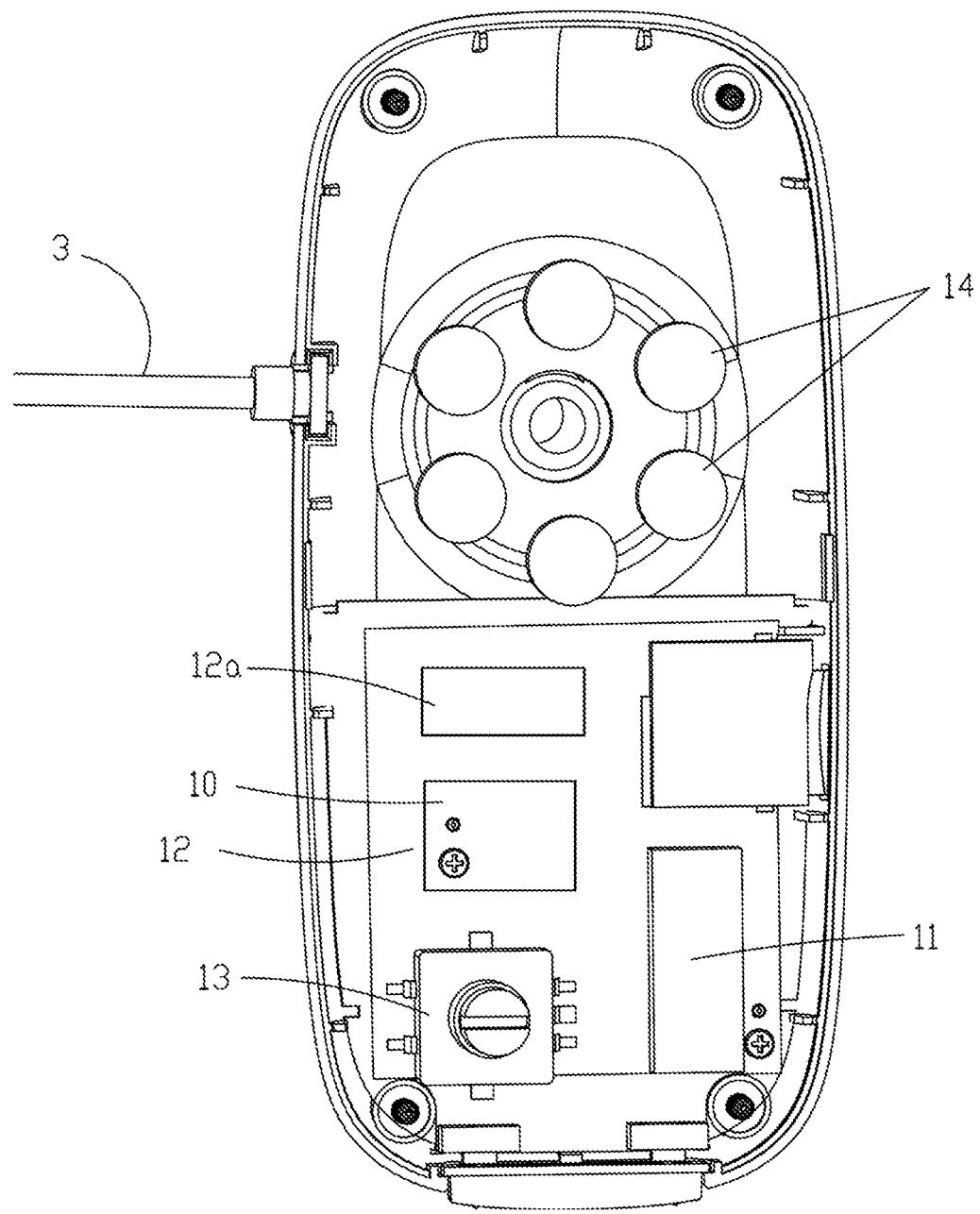
FIG. 1 is an isometric view showing internal components within a housing of a transmitter for a car according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 2:
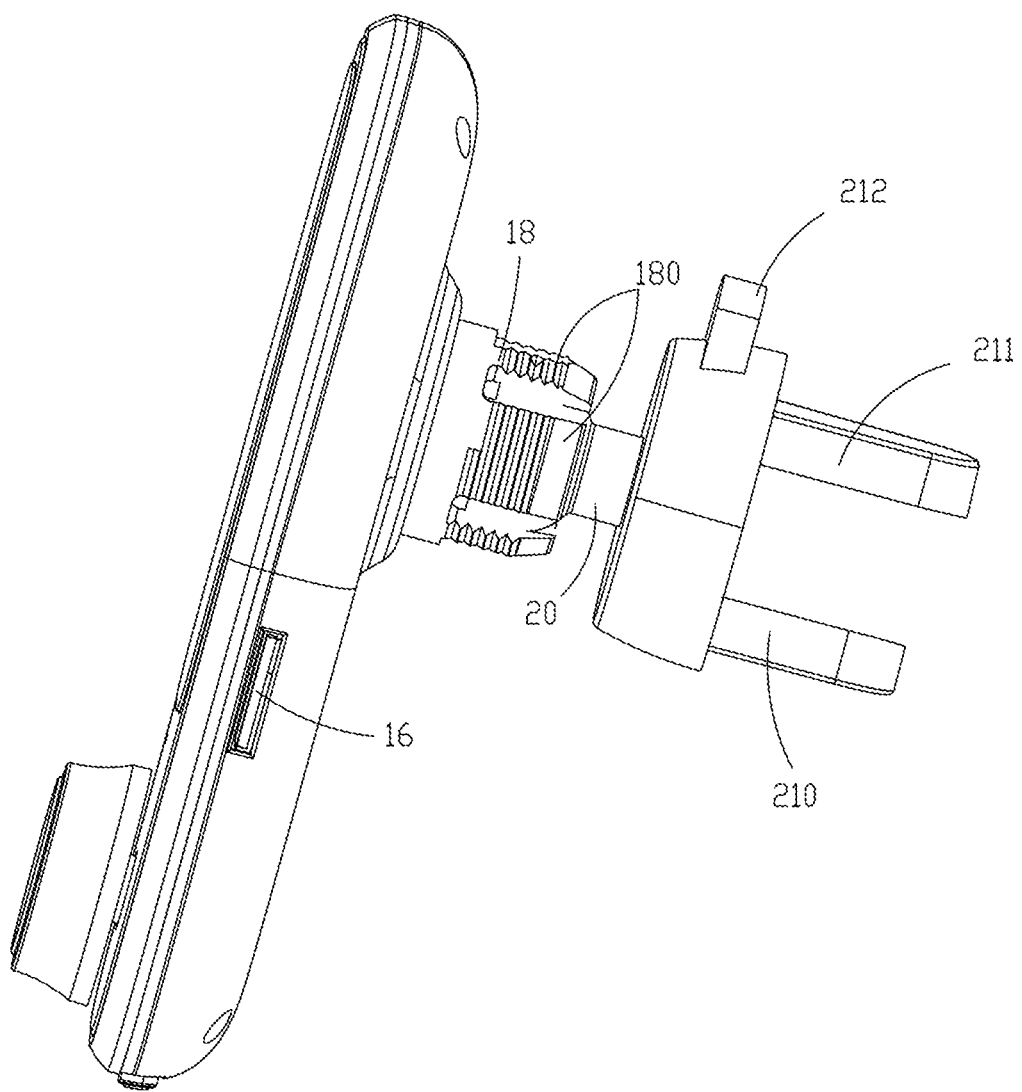
FIG. 2 is an isometric view of the transmitter, with a rotary knob omitted for clarity.
Figure 3:
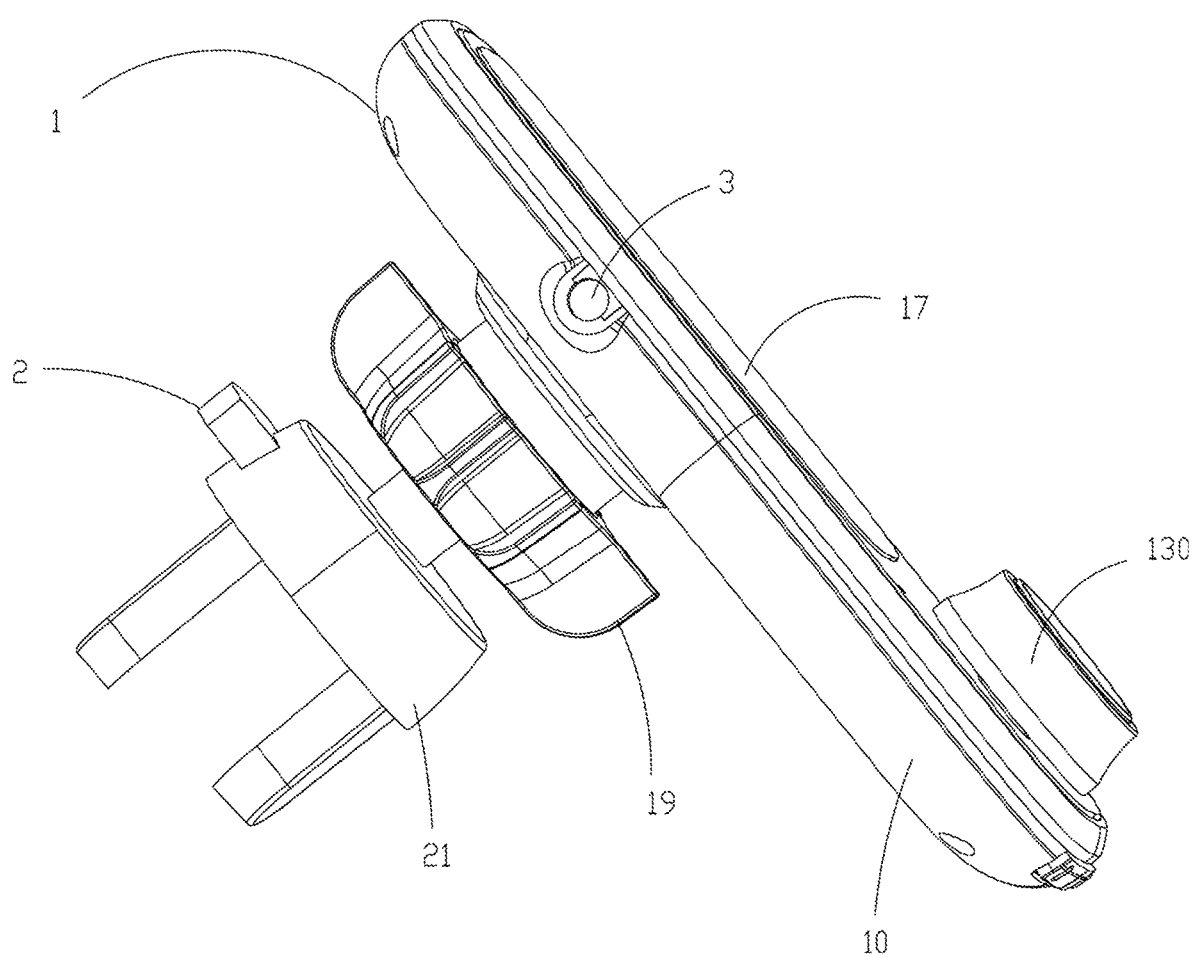
FIG. 3 is an isometric view of the transmitter viewed from a different perspective.

Referring to FIGS. 1-3, in one embodiment, a portable FM transmitter 100 for a car includes a housing 1, a mounting member 2 and a cable 3. The housing 1 is rotatable with respect to the mounting member 2. The housing 2 includes therein a magnetic member 14, a circuit board 12, a Bluetooth module 10, an FM transmitting module 11, and a control module 12a that are electrically connected to the circuit board 12. The magnetic member 14 is fixed in the housing 2 and used to magnetically attract an electronic device (e.g. a cell phone), which allows the electronic device to be detachably connected to the housing 1. The cable 3 is electrically connected to the circuit board 12. After the Bluetooth module 10 is connected to the electronic device, the control module 12a receives an audio file transmitted from the electronic device through the Bluetooth module 10, and processes the audio file into audio signals. The control module 12a then transmits the audio signals to the FM transmitting module 11, and the FM transmitting module 11 transmits the audio signals to a car radio of the car.

In the embodiment, the FM transmitter 100 can be electrically connected to a power supply port of the car through the cable 3, which allows the power supply port to supply electrical power for the transmitter 100. When in use, the electronic device is paired with and connected to the Bluetooth module 10. Then, the car radio is turned on, and the frequency band of the car radio is adjusted to the frequency band of the FM transmitting module 11. When the external electronic device is operated, the FM transmitting module 11 transmits the audio signals processed by the control module 12a to the car radio, thereby playing audio through the car radio. Since the magnetic member 14 is capable of magnetically attracting the electronic device, the FM transmitter 100 can serve as a holder to detachably connect the electronic device thereon. When the electronic device is a cell phone, a user can fix the electronic device to the FM transmitter 100 and use the electronic device as a GPS navigation device while driving. The magnetic member 14 can be selected to have a strong magnetic attraction force, so that the external electronic device can be effectively prevented from falling. Compared with some conventional holders for holding a mobile phone, it not only protects the outer casing of the electronic device, but also adapt to different electronic devices of different size. Since the housing 1 is rotatable with respect to the mounting member 2, the electronic device can be rotated to a desired orientation so as to allow a user to conveniently view information displayed on the electronic device.

In one embodiment, the transmitter 100 further includes at least one power output interface 16. The power output interface 16 is electrically connected to the circuit board 12, and used to supply power to the electronic device.

In one embodiment, when the battery of the electronic device is low, power output interface 16 can supply electrical power for the electronic device through a data cable. The electronic device can thus be timely charged without using ports of the car.

In one embodiment, the housing 1 further includes therein an adjustment module 13 that is electrically connected to the circuit board 12. The adjustment module 13 is used to receive a manual operation from a user to adjust an operating state of the electronic device and a frequency band of the FM transmitting module 11.

In one embodiment, the adjustment module 13 includes an adjustment member 130, through which adjustment of the operating state of the electronic device and the frequency band of the FM transmitting module 11 is achieved.

In the embodiment, a user can switch to the previous/next song, play/pause music, adjust volume and a frequency band of the FM transmitting module 11 through the adjustment module 13. Specifically, a user can press the left end of the adjustment member 130 to switch to a previous song, press the right end of the adjustment member 130 to switch to the next song, press the upper end of the adjustment member 130 to increase the volume, press the lower end of the adjustment member 130 to lower the volume, and rotate the adjustment member 130 to adjust the frequency band of the FM transmitting module 11. That is, a user can operate the adjustment member 130 to perform different action such as play, pause, skip tracks, volume adjustment, etc. without interacting with the electronic device, which is easy and may enhance driving safety.

In one embodiment, the transmitter 100 further includes a display 17 connected to the housing 1 and electrically connected to the circuit board 12.

In one embodiment, the display 17 displays the real-time frequency band of the FM transmitting module 11 and the current audio playing state of the electronic device, such as volume, song title, playing progress, etc.

In one embodiment, the transmitter 100 further includes an elastic member 18 arranged on a side opposite the display 17. The mounting member 2 includes a projecting portion 20, and is partly received in the elastic member 18.

In one embodiment, the elastic member 18 includes a number of arms 180 that corporately define a space, and the projecting portion 20 is partly received in the space.

In one embodiment, the transmitter 100 further includes a rotary knob 19 that is rotatably connected to the elastic member 18. The rotary knob is rotatable with respect to the elastic member 18 and used to cause the arms 180 to abut against or disengage from the projecting portion 20.

In the embodiment, when the rotary knob 19 is rotated clockwise, the arms 180 gradually releases the projecting portion 20, which allows the user to rotate the housing 1. When the housing 1 is adjusted to a desired orientation, the rotary knob 19 can be rotated counterclockwise to drive the arms 180 to come into close contact with the projecting portion 20, thereby fixing the projecting portion 20 to the elastic member 18 and preventing the housing 1 from disengaging from the mounting member 2.

In one embodiment, the mounting member 2 includes a clamping member 21, and the projecting portion 20 is fixed to the clamping member 21.

In one embodiment, the clamping member 21 includes a first clamping finger 210, a second clamping finger 211 and a button 212 to drive the first clamping finger 210 and the second clamping finger 211 to move toward or away from each other. The distance between the first clamping finger 210 and the second clamping finger 211 can then be adjusted to a proper value, which allows the first clamping finger 210 and the second clamping finger 211 to be inserted into the air vent of the car.

In the embodiment, when in use, the button 212 is pulled to increase the distance between the first clamping finger 210 and the second clamping finger 211. The first clamping finger 210 is then inserted into a slot of the air vent, and the second clamping finger 211 is then inserted into another slot of the air vent. The button 212 is then pushed to drive the first clamping finger 210 and the second clamping finger 211 to move toward each other and tightly abut against two blades of the air vent. The clamping member 21 is thus attached to the air vent.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A transmitter for a car, comprising: a cable; a housing comprising therein a magnetic member, a circuit board, a Bluetooth module, an FM transmitting module, and a control module that are electrically connected to the circuit board, the magnetic member being configured to magnetically attract an electronic device, which allows the electronic device to be detachably connected to the housing, the cable being electrically connected to the circuit board; a mounting member that is rotatable with respect to the housing; a display connected to the housing and electrically connected to the circuit board; and an elastic member arranged on a side opposite the display, the mounting member comprising a projecting portion that is partly received in the elastic member; wherein after the Bluetooth module is connected to the electronic device, the control module is configured to receive an audio file transmitted from the electronic device through the Bluetooth module, and process the audio file into audio signals, the control module is further configured to transmit the audio signals to the FM transmitting module, and the FM transmitting module is configured to transmit the audio signals to a car radio of the car; and wherein the housing further comprises therein an adjustment module that is electrically connected to the circuit board, the adjustment module is configured to receive a manual operation from a user to adjust an operating state of the electronic device and a frequency band of the FM transmitting module.

2. The transmitter according to claim 1, further comprising at least one power output interface, wherein the power output interface is electrically connected to the circuit board, and the power output interface is configured to supply power to the electronic device.

3. The transmitter according to claim 1, wherein the adjustment module comprising an adjustment member, through which adjustment of the operating state of the electronic device and the frequency band of the FM transmitting module is achieved.

4. The transmitter according to claim 1, wherein the elastic member comprises a plurality of arms that corporately define a space, and the projecting portion is partly received in the space.

5. The transmitter according to claim 4, further comprising a rotary knob that is rotatably connected to the elastic member, wherein the rotary knob is rotatable with respect to the elastic member and configure to cause the arms to abut against or disengage from the projecting portion.

6. The transmitter according to claim 1, wherein the mounting member comprises a clamping member, and the projecting portion is fixed to the clamping member.

7. The transmitter according to claim 6, wherein the clamping member comprises a first clamping finger, a second clamping finger and a button configured to drive the first clamping finger and the second clamping finger to move toward or away from each other.

* * * * *